W. B. GOODWIN.
VEHICLE.
APPLICATION FILED MAR. 29, 1915.
1,171,942.
Patented Feb. 15, 1916.
2 SHEETS—SHEET 1.
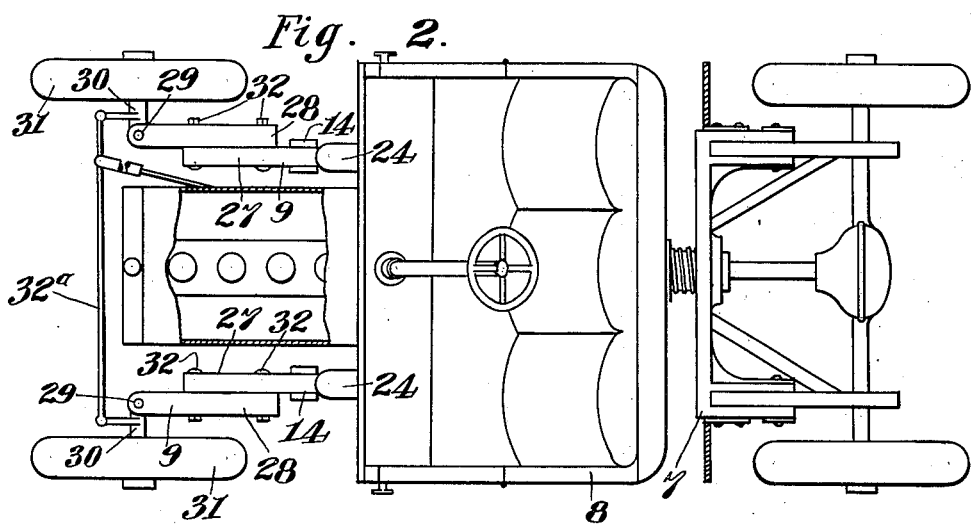
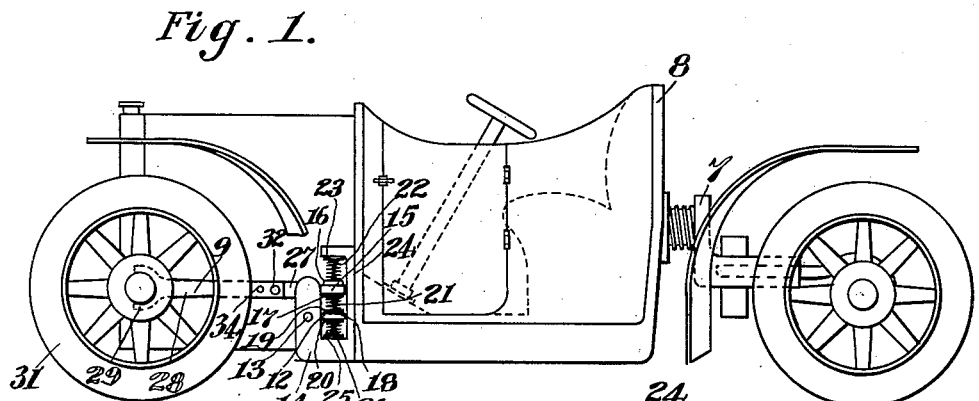
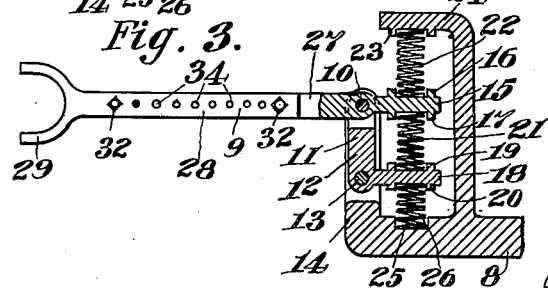

W. B. GOODWIN.
VEHICLE.
APPLICATION FILED MAR. 29, 1915.
1,171,942.
Patented Feb. 15, 1916.
2 SHEETS—SHEET 2.
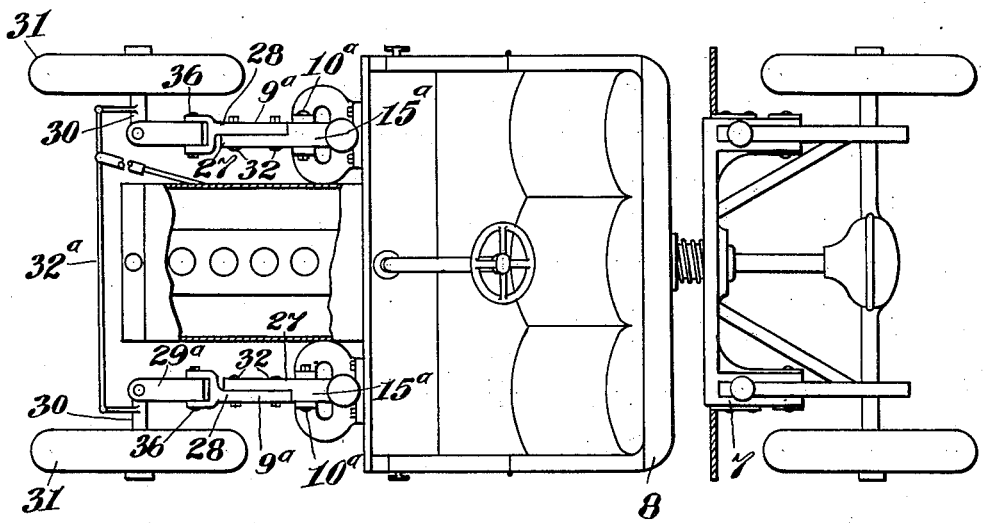
Fig. 5.
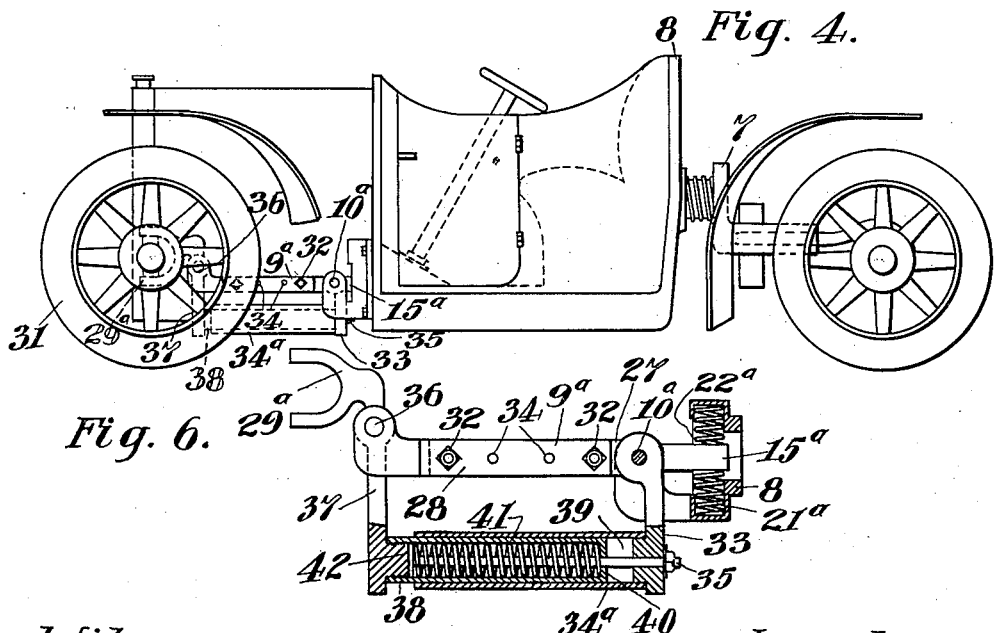
Fig. 4.
Fig. 6.
Witnesses.
G. Garland Brown.
W. Thornton Bogert.
Inventor.
William B. Goodwin
By Walter H. Murray
Attorney

UNITED STATES PATENT OFFICE.

WILLIAM B. GOODWIN, OF COLUMBUS, OHIO.

VEHICLE.

1,171,942.  Specification of Letters Patent.  Patented Feb. 15, 1916.

Application filed March 29, 1915. Serial No. 17,603.

*To all whom it may concern:*

Be it known that I, WILLIAM B. GOODWIN, a citizen of the United States of America, and resident of Columbus, county of Franklin, State of Ohio, have invented certain new and useful Improvements in Vehicles, of which the following is a specification.

This invention relates to improvements in vehicles and particularly to improvements in spring suspension devices of motor vehicles.

The present invention relates to improvements in vehicles of the type illustrated and described in my co-pending application serially numbered 808,083, but has for an abject to produce an improved spring suspension for vehicles of this type in which the vehicle chassis is underslung and in which each wheel carrying axle is independent and free to move in a substantially vertical direction and to move horizontally with relation to the vehicle chassis in overcoming shocks received by the road wheels of the vehicle when it is in motion. This and other objects are attained in the vehicle spring suspension described in the following specification and illustrated in the accompanying drawings in which;

Figure 1 is a side elevation of a vehicle having the preferred type of spring suspension embodying my invention. Fig. 2 is a plan view of a vehicle illustrated in Fig. 1. Fig. 3 is a fragmental sectional elevation of the preferred form of spring suspension device embodying my invention. Fig. 4 is a view similar to Fig. 1 but illustrating a vehicle having a modified form of spring suspension embodying my invention. Fig. 5 is a plan view of the vehicle illustrated in Fig. 4. Fig. 6 is a fragmental sectional elevation of the modified form of spring suspension device embodying my invention.

In the vehicle illustrated in the accompanying drawings, the body chassis 8 is mounted at its rear upon a secondary chassis 7 which embodies all of the details of the rear secondary chassis disclosed in the drawings and described in the specification of my above mentioned co-pending application. As shown, this secondary chassis 7 is pivotally mounted at its center upon the primary or body chassis 8 and is adapted to have yielding motion toward and away from the primary or body chassis in overcoming shocks transmitted to it by the rear road wheels. The manner of mounting the rear or secondary chassis upon the primary chassis is identical with the manner of mounting the secondary chassis upon the primary chassis in my above mentioned co-pending application. In addition to this the secondary chassis itself is in all respects like that of the secondary chassis illustrated and described in the co-pending application. The front secondary chassis of the co-pending application is however, eliminated in the construction forming the subject matter of the present application and a new and improved suspension device embodying my present invention is substituted in its place. This improved suspension device is illustrated in its preferred form in Sheet 1 of the drawings and consists of a forwardly extending arm 9 which is pivotally mounted at a point 10 at the end of one arm 11 of bell crank 12 which is pivoted at a point 13 upon the forward upturned extension 14 of the primary or body carrying chassis 8 of the vehicle. The arm 9 is provided with a rearward extension 15 upon the upper and under face of which spring receiving cups 16 and 17 are formed. The bell crank 12 is also provided on its rearwardly extending arm 18 with spring receiving cups 19 and 20 which are formed upon the respective upper and under faces of the arm. Located in the cups 17 and 19 of the respective extensions 15 and 18 of the arm and bell crank, is located a coil spring 21, while in the cup 16 of the rearward extension 15 of the arm 9 a coil spring 22 is located, the opposite end of the spring being located in a cup 23 formed on the under face of an overhanging arm 24 extending from the primary or body chassis 8. A spring 25 is also provided, which occupies the cup 20 formed on the under face of the rearward extension 18 of the bell crank 12 and is seated at its opposite end in a cup 26 formed in the forward extension 14 of the primary or body chassis. With this construction the end of the arm 9 is permitted to move upwardly and downwardly in a substantially vertical direction about the pivot point 10, movement of the arm being restrained by the springs 21 and 22 seated in the respective cups 16 and 17 of the rearward extension 15 of the arm. The arm may also be subjected to a movement longitudinally of the vehicle, since the bell crank 12 which is pivoted at the point 13 will permit the arm 11 to have rotatory motion about the point 13 and thereby carry the pivotal point 10 of the arm backward or forward longitudinally of the vehicle.

In order to render this suspension device more sensitive and also to increase or decrease the degree of flexibility with which the road shocks encountered during the motion of the vehicle, may be absorbed, I have provided means for increasing or decreasing the length of the arm 9 in order to increase or decrease the leverage through which the motion of the wheel would bring the springs 21 and 22 into action. This means consists in dividing the arm so that a front wheel carrying portion 28 and a rear chassis supporting portion 27 are provided. It is the rear portion 27 which is pivoted at the point 10 upon the forward extension 14 of the body chassis and which is provided with the rearward extension 15 having the cups 16 and 17 formed thereon. The forward portion 28 is provided with the yoke or fork 29 which is adapted to receive the steering knuckle 30 carrying the axle of each of the front wheels 31. With this construction it will be seen that each of the front wheels is independent to move in a direction substantially vertical, and substantially horizontal, because of the previously described yielding connection with the bell crank 12 and the mounting springs 21, 22 and 25. The portions 27 and 28 of the arm 9 are adapted to be secured together in any desired position by means of bolts 32 which are adapted to be brought to register with any of a series of uniformly spaced apertures 34 formed in both the portions 27 and 28 of the arm. With this means of mounting each of the front wheels 31, the wheels are rendered independent of one another so as to move to overcome obstacles in the road without interference with each other, as when the two wheels are connected with a rigid axle as in ordinary vehicle construction. In order to control the wheels 31 to properly direct the vehicle in its path of travel I have provided the usual steering mechanism 32ª.

In the modified form of my invention illustrated in Figs. 4, 5 and 6, the front road wheels of the vehicle are mounted in a manner similar to the mounting provided in the device illustrated in Fig. 3 and previously described, but in this modified construction the arm 9ª is provided at its pivotal point 10ª with a depending extension 33 which carries a tube 34ª and a centrally disposed rod 35. The arm is constructed to be adjustable in the same manner that the arm 9 of the device illustrated in Fig. 3 is constructed, but is provided at its end with a yoke or fork 29ª which is pivotally mounted at a point 36 formed on the end of the arm 9ª instead of being formed integrally with the arm as illustrated in Fig. 3. The yoke or fork 29ª is provided with a depending extension 37 which is brought adjacent to the tube 34ª extending from the extension 33 of the arm 9ª and is provided with a tube 38 which coöperates with the tube 34ª and telescopes with it in such a manner as to provide an air space 39 adjacent to the extension 33 for the purpose of forming an air cushion when the tubes are telescoped one within the other during the reflex action of the device. The rod 35 is slidingly mounted in an aperture formed in the extension 33 and is provided with a disk 42 which contacts the extension 37 in its normal position as that when the fork 29ª is moved backwardly about its pivotal point 36 the tube 38 will be moved relatively to the tube 34ª and the extension 33, but the rod 35 will remain stationary with its adjustment nut 35ª in engagement with the extension 33. The telescoping tube 38 is formed with a closed end 40 and contains a spring 21 which bears at one of its ends upon the closed end 40 and at its opposite end upon the disk 42 secured to the end of the rod 35 adjacent to the extension 37. The action of the arm 9ª in this modified construction is similar to the action of the arm 9 illustrated in my preferred construction, since an extension 15ª is provided, which bears upon springs 22ª and 21ª in either direction of movement of the arm.

The operation of the preferred form of my invention illustrated in Figs. 1, 2 and 3 is as follows: When in the movement of the vehicle an obstruction is encountered, the force of the blow given the front wheel is absorbed in a direction substantially at an angle of 45 degrees to the surface of the road, in the following manner. The tendency of the arm 9 upon receiving the blow given to it through the front wheel is to move in a substantially vertical direction about its pivotal point 10. This movement is however, somewhat modified by the horizontal component of the force of the shock transmitted to the front wheel, which causes the bell crank 12 to move backwardly upon its pivotal point 13, thereby also moving the pivotal point 10 of the arm backwardly and thus carrying the arm and front wheel with it. Because of this combined vertical and horizontal movement of the wheel carrying end of the arm, the resultant movement thereof is in a direction at an angle to the horizontal surface of the road and at an angle to a line at right angles to the surface of the road. This permits the wheel to move in such a direction that the force of a blow is absorbed in such a manner that no portion of the vehicle is subjected to the slightest shock since the shocks are each and every one absorbed through the springs 21 and 22 during the vertical movement of the arm and by the spring 25 during the rocking movement of the bell crank 12.

The operation of the spring suspension device illustrated as a modified form of my invention in Figs. 4, 5 and 6 is similar to the operation of the device illustrated in Fig. 3 and previously described, inasmuch as the vertical movement of the arm $9^a$ about its pivotal point $10^a$ is concerned, the springs $21^a$ and $22^a$ absorbing all shocks given the arm in such a movement. The horizontal component of the shock is however, absorbed by the spring 41 located within the tube 38. The action of this portion of the mechanism is brought about by movement of the fork $29^a$ backwardly to cause the arm to rock about its pivotal point 36 and to pull upon its connected tube 38 in order to cause compression of the spring 41 between the closed end 40 of the tube and the disk 42 connected with the rod 35 passing through the extension 33. Rebound or reverse action of the fork $29^a$ and its extension will of course cause the air in the chamber 39 to absorb the shock occasioned thereby. It will be seen that in this modified construction as in the preferred construction previously described, each of the front road wheels is independent of each other and is free to move over obstructions without influencing the opposite wheel to the slightest extent. Another feature of my invention is that by means of the spring suspension described and illustrated, the vehicle is underslung in such a manner that it is supported upon the lower ends of substantially vertical hanging links to which the road wheels are connected.

Having thus described my invention, what I claim is:

1. A motor vehicle comprising a body chassis, a secondary chassis pivotally attached to the body chassis at the one end, and links pivotally attached to the axles of the road wheels, at the opposite end depending from the axles and pivotally attached to the body chassis whereby the body chassis is underslung with relation to the wheel axles.

2. In a motor vehicle the combination of a body chassis, a secondary chassis pivotally attached to the body chassis at one end, links pivotally attached to the body chassis at their lower ends at the opposite end of the body chassis said links being disposed vertically, means connecting the upper ends of the links with the road wheels, and a second means adapted to yieldingly maintain the links in their vertical positions.

3. In combination in a motor vehicle, a body chassis, road wheels, and links pivotally attached at their lower ends to the body chassis and means at their upper ends adapted to connect the links to the wheel axles.

4. A spring suspension for motor vehicles comprising a pivotally mounted arm adapted to mount a road wheel at one of its ends, means located at the opposite end of the arm and adapted to permit yielding rotary motion of the arm about its pivotal point, a pivotally mounted link adapted to mount the arm at its pivotal point and adapted to permit substantial longitudinal movement of the arm, and means adapted to permit yielding rotary motion of the link.

5. In a motor vehicle the combination of a body chassis, a secondary chassis pivotally attached to the body chassis and adapted to carry the road wheels at one end of the body chassis, and links pivotally attached at opposite sides to the other end of the body chassis and adapted to carry the road wheels at the opposite end of the vehicle whereby the body chassis will have three point suspension.

In testimony whereof, I have hereunto subscribed my name this 26th day of March, 1915.

WILLIAM B. GOODWIN.

Witnesses:
WALTER F. MURRAY,
W. THORNTON BOGERT.